July 17, 1928.

M. E. POPKIN 1,677,367

CLOTH SPONGING AND SHRINKING MACHINE

Filed Aug. 16, 1927      6 Sheets-Sheet 1

Inventor
Martin E. Popkin
By Edwin K. Samuels
Attorney

Witnesses

July 17, 1928. 1,677,367
M. E. POPKIN
CLOTH SPONGING AND SHRINKING MACHINE
Filed Aug. 16, 1927 6 Sheets-Sheet 3

July 17, 1928.

M. E. POPKIN 1,677,367

CLOTH SPONGING AND SHRINKING MACHINE

Filed Aug. 16, 1927    6 Sheets-Sheet 4

Inventor
Martin E. Popkin

Witnesses

By
Attorney

Patented July 17, 1928.

1,677,367

UNITED STATES PATENT OFFICE.

MARTIN E. POPKIN, OF BALTIMORE, MARYLAND, ASSIGNOR OF ONE-HALF TO J. SCHOENEMAN, INCORPORATED, OF BALTIMORE, MARYLAND, A CORPORATION OF MARYLAND.

CLOTH SPONGING AND SHRINKING MACHINE.

Application filed August 16, 1927. Serial No. 213,262.

The present invention relates to a machine for steaming and pressing cloth, otherwise known in the trade as a textile sponging and shrinking machine.

In accordance with the practice previously followed the cloth, together with a leader of canvas or duck, is wound on a perforated cylinder to which steam under pressure is supplied. The steam being most conveniently fed into the journals at the center of one axial end, issues through the perforations, passing through the duck leader and through the cloth, permeating it and moistening it more or less completely and uniformly. The steam is allowed to flow until it passes freely from the topmost layer of cloth, thereby indicating that the steam has thoroughly saturated the fabric. Thereafter, the steam pipe is closed and a vacuum is applied to the cylinder, the object being to cool and set the cloth and extract the excess moisture.

In the operation of this type of machine as previously constructed, numerous difficulties and imperfections have been encountered which it is the object of the present invention to overcome. The steaming cylinder of the previous machine is a perforated metal cylinder, the perforations consisting of a series of holes bored through the cylinder wall for the purpose already outlined. Numerous machines of this type have been inspected and the porosity of these machines, i. e., the area of the perforations as compared to the area of the cylinder does not, in the majority of cases, exceed three per cent. Due to this low percentage of porosity the fabrics being steamed can not be uniformly treated, the portion of the fabric which is nearest to each perforation receiving the severest, or possibly the most thorough treatment, whereas the most remote portions are more mildly or less thoroughly treated. Also, the steam pressure drops as the steam progresses from the end where it is admitted along the cylinder toward the other end. When the vacuum is applied the same tendency prevails with the result that the fabric can not be uniformly treated or steamed.

This uneven treatment results in strains and puckering which warp the fabric which thus can not be made to lie flat, the result being exceedingly detrimental to the fit of the garment which is the final product.

Another result of the defective operation is the tendency to burn the first yard or two of the fabric, particularly the fine fabrics, the first yard or two referred to being the portion which immediately overlies the cylinder. This tendency to burn the cloth is partly due to the high thermal conductivity of the metal and results from the high steam pressure used on account of the low percentage porosity of the cylinder. The high steam pressure is also made necessary by the number of wrappings of burlap or other cheap fabric ordinarily placed over the cylinder in an attempt to overcome the tendency to burn or scorch the first two or three layers of fabric. This covering of burlap greatly increases the resistance. The high steam pressures are not only necessary to overcome the resistance of the burlap, they also reduce the tendency to premature condensation.

In order to overcome these difficulties the steaming cylinder which is the subject of the invention is constructed with walls of porous material, as porous stone or equivalent porous material having unglazed inner and outer surfaces of which the pores are open, giving an easily permeable substance. This gives uniform porosity of the cylinder and permits the application of steam uniformly throughout the entire fabric since the pores in this material are in excess of the count of the average fabric treated and in warp and weft per square inch and the porosity of the cylinders of the preferred construction is approximately thirty per cent or ten times greater than the porosity of the metal cylinders now used.

In the operation of the previously known perforated metal cylinders, when the steam was admitted to the cylinder it escaped through the orifices nearest the steam inlet, the supply of steam and the pressure dropping as the escape of steam progresses along the cylinder away from the inlet. In the new form of cylinder the thickness of the plates and the nature of the pores give a tendency to throttle the steam until the pressure may be built up to five or ten pounds, when the steam flows through the pores throughout the cylinder with complete uniformity. Uniformity of flow is likewise obtained throughout the cylinder when the vacuum is applied.

It is also an important feature that owing to the low thermal conductivity of the stone or other porous material used, the fine fabrics which are most sensitive are not scorched or shriveled. The material which is preferably used in the construction of the cylinder walls, in accordance with the invention as developed up to the present time, is an artificial stone which in composition is approximately 99% silica, the bonding means being volatilized in the manufacture of the stone. A similar material is known in the trade as "filtrose."

An important feature of the invention whereby the condensation difficulty is overcome, resides in the provision of heating means preferably consisting of imperforate steam pipes within the cylinder which are steam heated independently of the steam supply to the perforations, the object being to pre-heat the cylinder internally and externally, i. e., as to the porous walls as well as the interior, with the result that condensation is practically obviated.

In the accompanying drawings I have illustrated a cloth sponging or steaming cylinder embodying the features of my invention, the illustration including a variation of details embodied in three different forms of the invention.

Figures 1, 7, 8, 9:
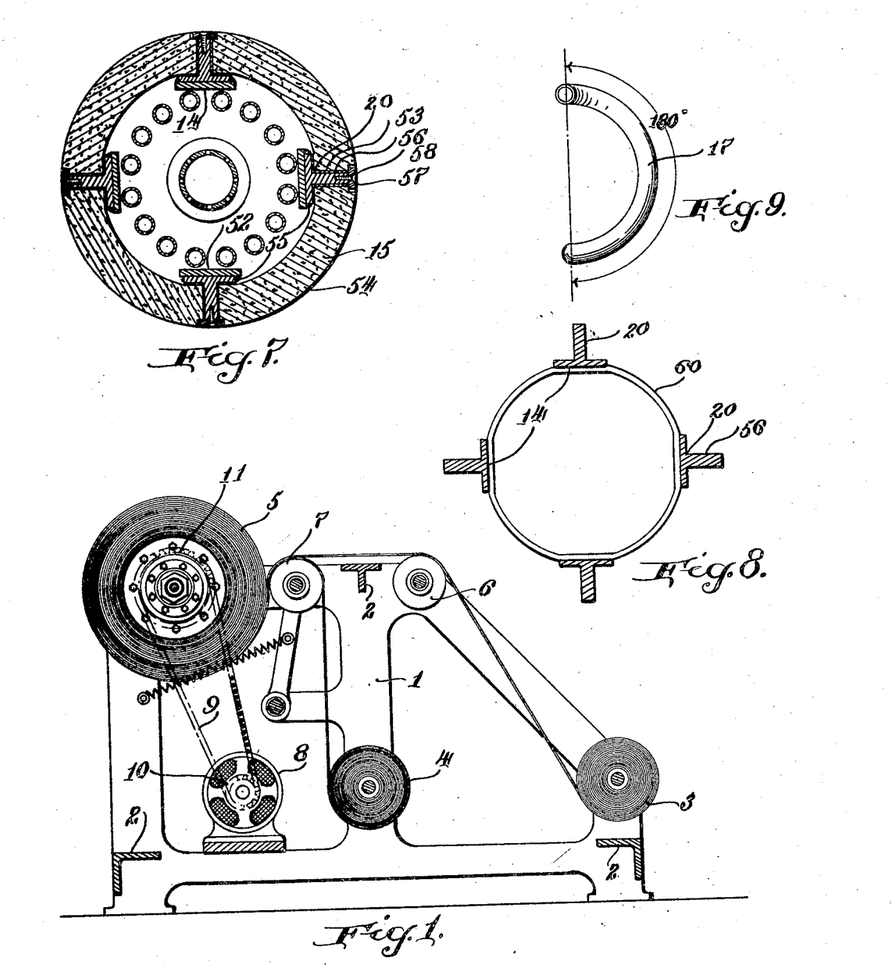
Figure 1 is a side elevation illustrating more or less diagrammatically a textile sponging or steaming and shrinking machine, the said figure showing the machine in side elevation.
Figure 7 is a section on the line 7—7 in Figure 6.
Figure 8 is a section on the line 8—8 of Figure 4 showing the frame dismantled, the central steam pipe being omitted.
Figure 9 is an end elevation showing one of the steam heating pipes.

Referring to the drawings by numerals, each of which is used to indicate the same or similar parts in the different figures, the machine, as illustrated in a general way in Figure 1, comprises two opposite side frames 1. The side frames may be connected by means of longitudinal frame members 2. Rotatively mounted on parallel axes in said frame are a plurality of rollers comprising cloth roller 3 at the bottom front, leader roller 4 at the bottom center and sponging and shrinking cylinder or roller 5 at the upper rear, the cloth being delivered to the cylinder from the roller 3 and guided by an idler roller 6, the leader and cloth combined being delivered to the cylinder 5 by an idler roller 7 immediately in front of the cylinder.

The cylinder 5 may be rotated in any suitable manner as by means of an electric motor 8 and driving connection to and with the cylinder 5 of any suitable type as a chain 9 and sprockets 10 on the motor shaft and 11 on the cylinder.

The cylinder in the first form illustrated in Figures 2 to 9 comprises a frame 14 and porous walls 15 of low conductivity. Steam is supplied by way of sponging steam pipe 16 leading steam to the inside of the cylinder to be exuded through the porous walls and steam heating pipes 17. The frame is composed of material which is preferably non-corrosive. This is shown in the form of longitudinally extending T bars 20 and cylinder heads 21 which, in the form illustrated in the figures referred to, consist each of two overlying sections 22 and 24 held together by bolts 25 or in any other suitable manner. The outer sections 22 at both ends are shown as dished or concaved at 26, the inner section 24 being substantially flat forming chambers 27 and 27' to which the heating pipes 17, already referred to, are connected, the preferred form being thus constructed at each end.

Figure 5:
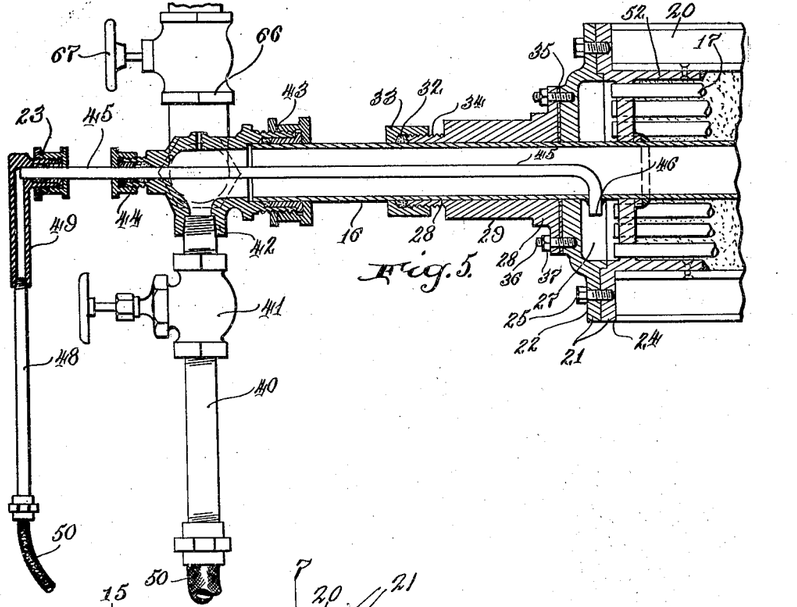
Figure 5 is a vertical central section taken on the line of the axis of the cylinder showing the left hand end of the same with the steam supply pipes in elevation, the wall sections at the front being removed.
Figure 6:
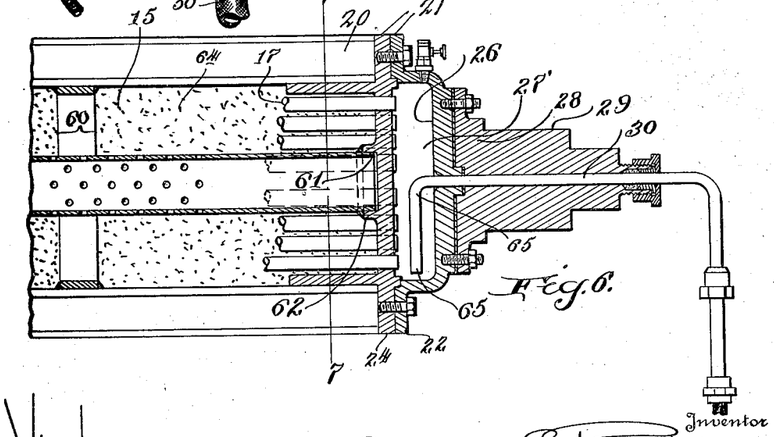
Figure 6 is a similar section of the right hand end of the cylinder.

Secured to the outer member 22 of the cylinder head at each end and projecting outwardly therefrom concentric with the cylinder is a journal member 28 having a journal or bearing engaging portion 29. This member in both instances is apertured centrally in the direction of the axis. At the left hand end of the cylinder the sponging steam pipe 16 enters the cylinder through the journal member 28 concentrically therewith and in line with the axis. The joint between the pipe and the cylinder is made tight by means of packing 32 held by means of a suitable packing nut 33 which takes over the reduced end 34 of the journal member which is threaded for this purpose, also a sheet packing 35 is preferably placed between the outer member 22 of the cylinder head and the journal member 28 which, as shown, is held by bolts 36 and nuts 37. The right hand journal member, as shown in Figure 6, has a small central aperture through which is passed heating steam pipe 30 connected to the chamber 27' in the end and leading outwardly through the journal to any suitable point of discharge, whereby the condensed or used steam from the heating pipes 17 may be discharged or returned to the boiler.

The sponging steam pipe 16 is fed from a steam supply pipe 40 which may have a shut-off valve 41 and is connected at its upper end to a stationary fitting 42 to which the sponging steam pipe 16 is connected, rotating with the cylinder, as hereinafter described, relative to said fitting which is stationary, the fitting having a stuffing or packing box 43 whereby the rotary connection between the pipe 16 and the fitting 42 is made tight. The vacuum pipe 66 is connected to the fitting 42 in any suitable manner. It may be led into the fitting from the rear, as shown in Figure 5, the vacuum pipe descending to said fitting. The vacuum pipe is also provided with a shut-off valve 67.

A steam supply pipe 45 to the steam heating coils 17 enters the cylinder through the fitting 42 by way of pipe 16, the fitting being provided with a stuffing box 44 in axial alignment with the center of the sponging steam pipe 16 and the center of the cylinder. At the inner or delivery end the pipe 45 is, as shown, bent at right angles at 46 passing through the wall of the pipe 16 and delivering into the chamber 27 in the cylinder head to which the ends of the coil pipes 17 are connected. The steam supply is led to the pipe 45 by way of a heating steam supply pipe 48 connected to a fitting 49 having a stuffing box 23 which provides a rotary connection between the stationary fitting 49 and the rotary pipe 45 which is connected to the steam pipe 16 by the right angle end 45 to rotate therewith. The steam supply pipes 40 and 45 are preferably connected to the steam supply by flexible connections 50.

The frame 14 of the cylinder has been referred to as comprising the cylinder heads just described connected by T bars or other suitable frame members 20. These T bars, in the form of the invention shown, are four in number and the T bars are connected at each end by riveting, brazing, or in any suitable manner to lugs 52 which project inwardly from the inner sections 24 of the cylinder heads, being provided at the proper circumference of the cylinder heads for this purpose, i. e., spaced inwardly from the outer peripheries by the thickness of the cylinder walls 15. The porous walls 15 have already been referred to as composed of artificial or natural porous stone or other porous material of low heat conductivity. This is formed in sections 54 of arcuate cross section and of any convenient length. These sections 54 fit between the T bars 20, being supported on the inside by the laterally projecting flanges 55 of the T bars, the central webs of which 56 project outwardly between the sections 54, the wall sections being held at the edges by overlying longitudinal strips 57 which may be secured to the webs 56 by screw 58 or in any suitable manner. The strips 58 are shown as perforated at 59 particularly as to their edge portion at the sides of the web 56, the perforations being, if preferred, inclined inwardly toward the lateral centers of the strips. This provides substantially uniform porosity as to the entire surface of the cylinder. The edges of the sections may be packed with strips of asbestos, or other suitable packing 53.

Figure 2:
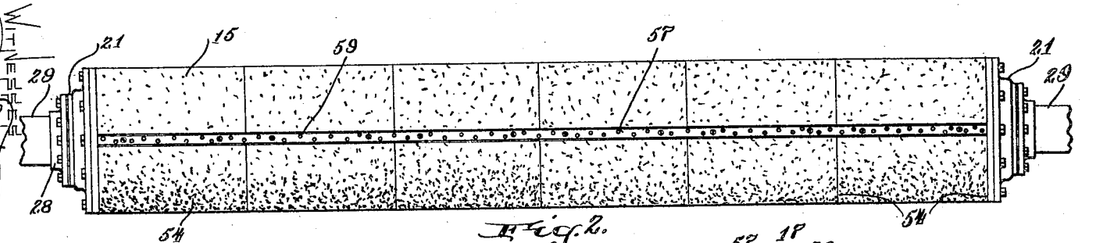
Figure 2 is a side elevation of the cylinder of the invention separated from the machine.
Figure 3:
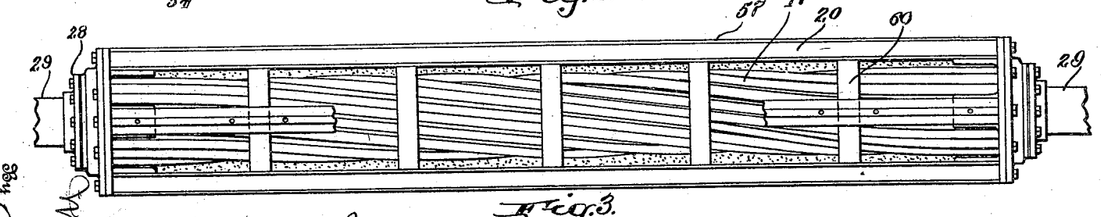
Figure 3 is a view corresponding to Figure 2, a portion of the cylinder walls and a small portion of the frame being removed to expose the internal construction.
Figure 4:
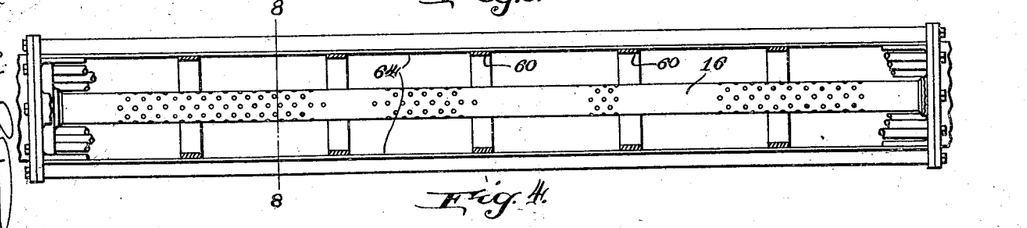
Figure 4 is a view showing the cylinder with half the wall covering removed, also the steam heating pipes are removed, the frame being shown in vertical central cross section.

The T bars 20, in the form of the invention shown, are supported at intervals corresponding to the length of the sections 54, see Figures 2, 3 and 4, by ribs or circular braces 60 which encircle the inner circumference of the cylinder, the bars being secured to the braces in any suitable manner at the intersections.

The sponging steam pipe 16 may extend the entire length of the cylinder coaxially therewith. As shown, it has an engagement at its end remote from the steam supply at 61 with the cylinder head which is provided with a circular socket or depression 62 centrally thereof to receive the pipe.

It will be noted that the coils or pipes 17 connect the chambers 27 formed in the heads at the opposite ends of the cylinders. The pipes 17, as shown, are formed each in a helix of 180 degrees turn, one of said pipes being shown in end view in Figure 9. This provides for contraction and expansion of the cylinder without injury to the pipes.

In the operation of the machine heating steam is fed to the chamber 27 at the left hand end by means of pipe 45, the steam being thus passed by way of coils 17 through the central chamber or area 64 of the cylinder, thus pre-heating or maintaining the temperature of the steam delivered to said chamber by the main steam pipe 16 and also pre-heating the porous walls 15 of the cylinder preventing excessive condensation, which has caused great difficulty previous to the process of this device. The condensed and used steam from the heating coils 17 is delivered to the chamber 27' in the cylinder head at the right of the cylinder, as seen in Figure 6, from which point it is discharged by way of the discharge steam pipe 30 which extends through the journal member 28 at the right hand end of the cylinder coaxially therewith, the pipe 30 being bent at right angles at its inner or intake end at 65, the end 65 being led to the bottom of the chamber 27 so as to take up the condensed moisture or water from the chamber.

The piece of cloth to be treated, which may run from forty to seventy yards, is wrapped with the leader around the cylinder. Then steam at a suitable pressure, depending upon the source of steam power available and the requirements of the particular cloth treated, due to the variation in thickness and class of cloth, is introduced by way of pipe 16. The steam heating pipes 17 are supplied with steam to prevent condensation in the cylinder. The steam is allowed to flow through the cylinder until it exudes freely from the top layer of leader cloth, thereby indicating that the fabric is thoroughly permeated, thereafter the steam supply is cut off and the vacuum is turned on the cylinder. The object of the last step is to cool and set the cloth and extract the moisture from the fabric. After the fabric has been cooled and the excess moisture extracted, the vacuum is cut off and the cylinder is rotated in the reverse direction, the cloth being thus removed and wound up on the roller 3 shown, or elsewhere, and the leader, after drying by means not shown, is re-wound on the roller 4.

Figure 10:
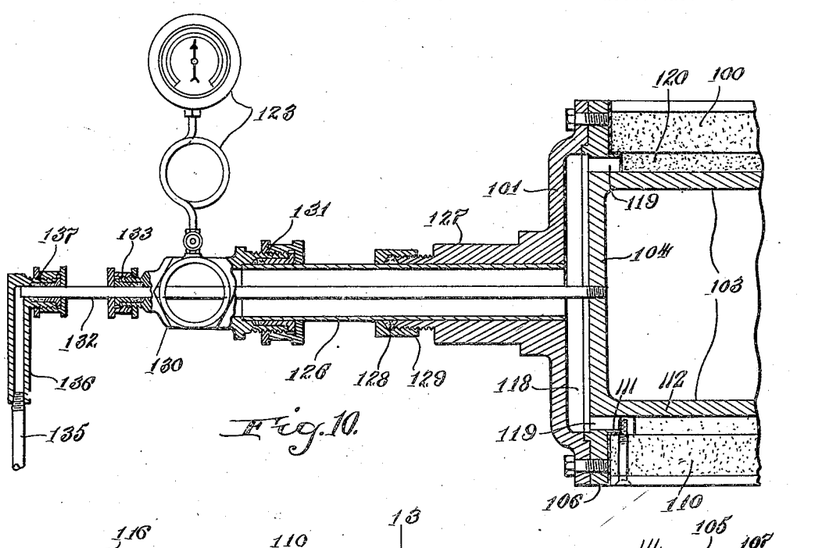
Figure 10 is a central axial section corresponding to Figure 5 showing a second form of the cylinder, the vacuum pipe being removed.
Figure 11:
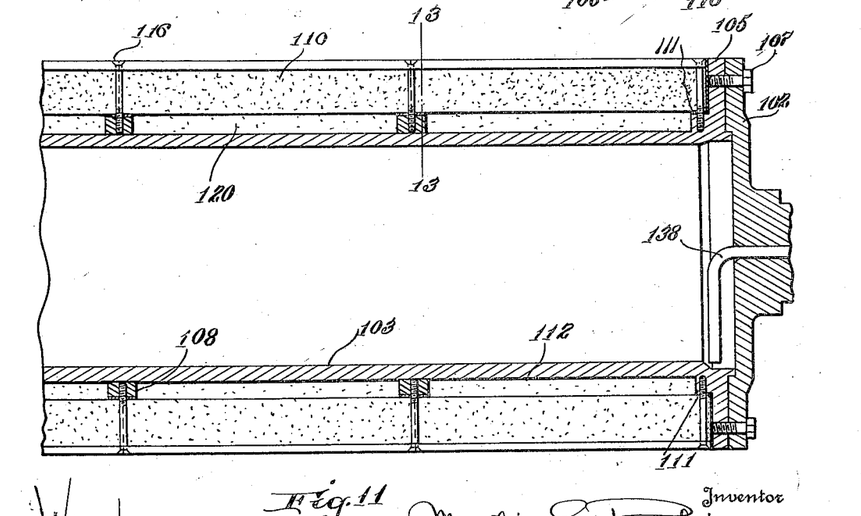
Figure 11 is a similar section showing the right hand end of the same type of cylinder. This figure corresponds to Figure 6.
Figure 12:
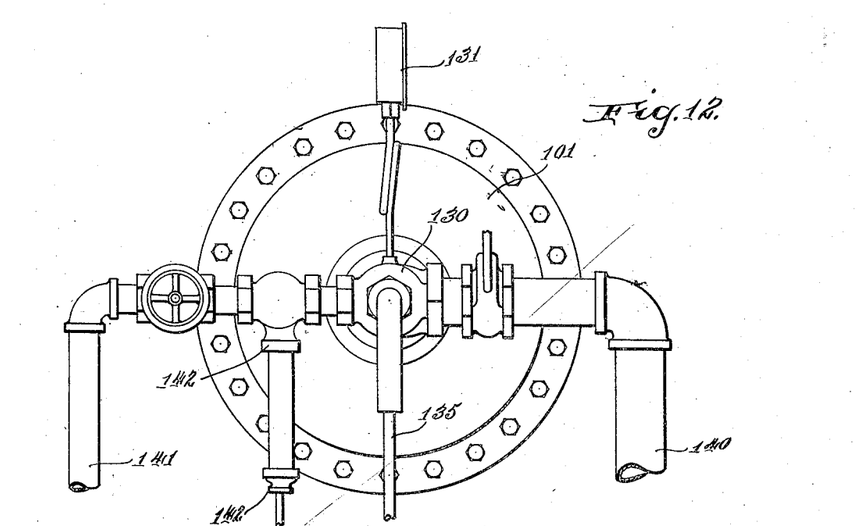
Figure 12 is a view of this type of cylinder showing the left end with the steam connections, which steam connections are applicable to any of the three types of cylinder disclosed.
Figure 13:
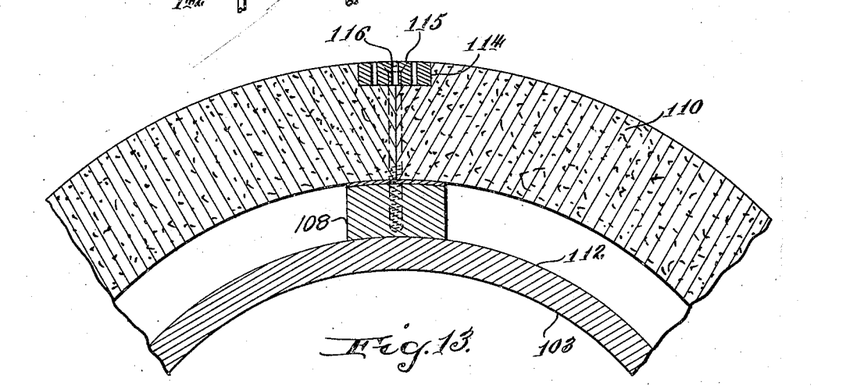
Figure 13 is a section on the line 13—13 of Figure 11, i. e., a transverse section near the end disclosing the manner of applying steam to the walls.

In Figures 10, 11 and 12 I have illustrated a second form of the steaming or sponging and shrinking cylinder. In this form of the invention the cylinder 100 consists of heads 101 and 102 connected by a tubular member 103 of large diameter as compared to the pipe 16, the central opening in the tube forming the central chamber of the cylinder. This tubular member is closed at one end, the left as shown, by an end wall 104 and is provided with a laterally projecting peripheral flange 105 at the right and 106 at the left end to which outwardly projecting flanges 106 and 105 the heads 101 and 102 are secured at their outer edges by bolts 107, or in any suitable manner. The tubular portion 103 also acts as a support or frame for the cylinder walls. The porous walls 110 which may be formed in sections, as already described, i. e., are placed with their inner surfaces in contact with or overlying the spacing blocks 108 forming annular chamber 120 between the walls and the tubular member 103. The sections rest at their end edges on shoulders 111 encircling the bases of the flanges 105, 106 on the inside and spaced outwardly from the outer periphery 112 of the tubular portion 103 by a distance corresponding to the thickness of the blocks 108.

The sections of the wall 110 may be grooved as to their meeting edges, as shown at 114, and are held in position by strips 115 which occupy the grooves and are secured to the strips and ribs 108 by means of screws 116.

The cylinder head 101 at one end, the left end, as shown in Figure 10, is dished or concave as to its inner surface at 118 forming a chamber, the opposite side of the chamber being formed by the end wall 104 of the tubular member 103, and the flange 106 which encircles the left end of the tubular member 103 is perforated at 119, the perforations preferably being a circularly aligned series of holes placed just outside the outer wall of the tube and connecting the chamber 118 to and with the annular space 120 between the porous wall sections 110 and the walls of the tube 103. This provides a steam supply chamber 120 from which steam under pressure issues through the porous walls 110 and this space is fed by way of sponging steam pipe 126 which enters the head 101 centrally thereof on the line of the axis, being suitably secured therein and surrounded by an apertured journal member 127. The pipe is packed and the joint between the same and the cylinder head is closed by a packing 128 held by packing nut 129 and the pipe 126 is rotatively connected to a stationary fitting 130 by a stuffing box 131. This fitting 130 is suitably connected to a gauge 123 and a heating steam pipe 132 is led through the fitting by way of a stuffing box 133 placed in line with the axis of the cylinder, the heating steam pipe 132 being led through the fitting and through the main steam pipe 126 and into the tubular chamber enclosed by the tubular member 103 which takes the place of the coil previously described as a heating element for maintaining the temperature of the steam which is fed to the perforated walls 100 which are also pre-heated or the temperature of which is maintained by this means.

The heating steam pipe 132 is connected to a heating steam supply pipe 135 by a suitable fitting 136 having a stuffing box 137 in line with the axis of the cylinder, to which stuffing box the pipe 132 is connected.

The used and condensed steam is exhausted from the tubular chamber 103 by way of a pipe 138 corresponding to the pipe 30, Figure 6, and which requires no further description.

Figure 12, looking at the cylinder from the left as seen in Figure 10, shows the piping. The heating or jacket steam supply pipe 135 is shown at the center, the vacuum pipe 140 entering the fitting 130 at the right. The main steam supply or sponging steam supply pipe 141 is shown at the extreme left and at 142 there is shown a steam separator of any commercial type, the details of which are not essential to the invention and are not illustrated.

The construction thus outlined has the advantage of economy and length of life, the use of perforated pipes and coils being eliminated by the provision of the heating tube or chamber 103 and the annular sponging steam chamber 120 surrounding the same. This construction is also regarded as possessing a high degree of efficiency on account of the large heating surface of the chamber 103 which is closely adjacent the entire circumference of the wall, the sponging steam chamber 120 being of large area and short transverse dimension surrounding the entire area of the heating chamber and, therefore, easily heated from heating member or tubular member 103 to a sufficient temperature to prevent condensation.

While the use of porous material of low heat conductivity has been described in connection with the cloth heating cylinder, it will be easily understood from the disclosure that this porous material is adapted for any use in the steam treatment of cloth under any circumstances in which the cloth is subjected to contact with a steam exuding surface. To provide such a steam exuding surface in accordance with the present invention, steam under pressure is confined in contact with one side or surface of the element or body composed of the porous material described, the other side or surface of the body being brought in contact with the cloth. A piece of protective fabric is preferably interposed between the surface of the porous material and the cloth being treated.

Figures 14, 15, 16:
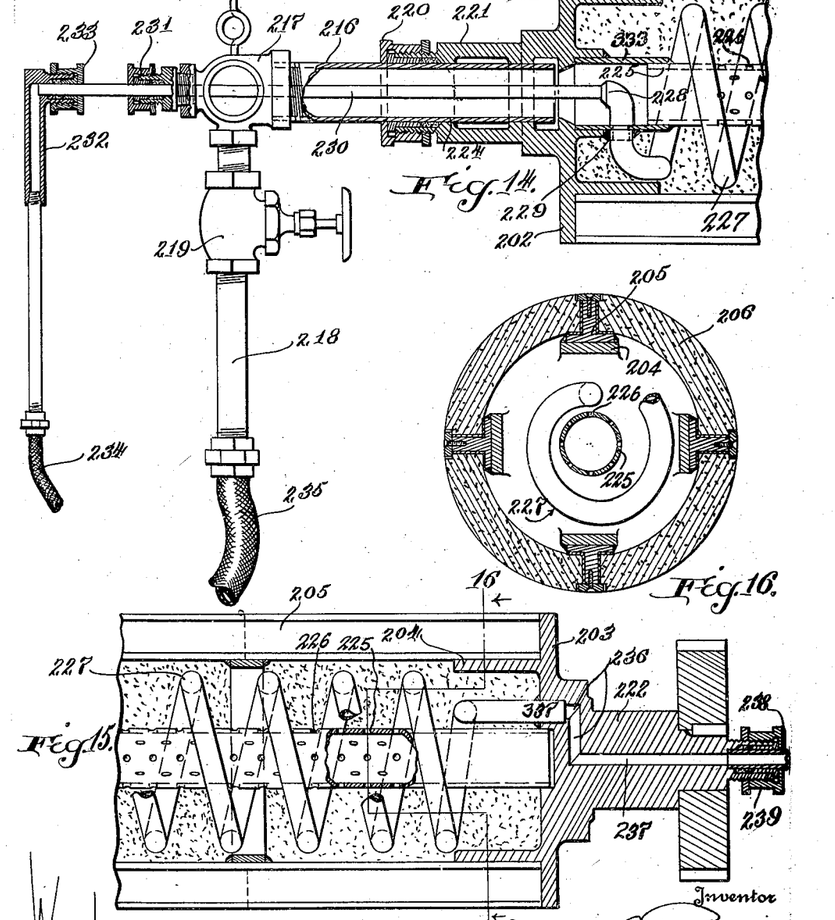
Figure 14 is an axial section showing a modification of the left hand end cylinder. This figure corresponds to Figure 5.
Figure 15 is a section similar to Figure 14, showing the right hand end of the same cylinder. This figure corresponds to Figure 6.
Figure 16 is a transverse section on the line 16—16 of Figure 15, the view being taken in the direction of the arrow on said figure.

In Figures 14, 15 and 16 I have illustrated still another structure in which a single heating coil is employed. The cylinder 201 is provided with unchambered single walled head members 202 at the left end and 203 at the right end of the cylinder. Both heads are, in the form of the invention shown, provided with four inwardly projecting lugs 204 to which are secured longitudinal T bars 205 of any suitable material, preferably non-corrosive metal. These T bars support the porous wall material 206, as described in connection with the first forms of the invention.

The sponging steam or main steam supply is fed to the cylinder at the center of the axial end at the left by way of a sponging steam pipe 216 which is stationary and connected to a stationary fitting 217 to which the sponging steam is led by way of a sponging steam supply pipe 218 controlled by a shut-off valve 219. The pipe 216 is connected to the rotary cylinder 201 by a stuffing box 220, the cylinder being provided with journal members 221, 222, the journal member at the left being apertured longitudinally at 224 concentrically with its axis to admit the pipe 216. This pipe 216 at its inner end is aligned and connected to and with the pipe 225 secured in the cylinder axially thereof in any suitable manner and provided with perforations 226 substantially throughout its entire length, which corresponds to the length of the cylinder. The pipe 225 is surrounded by a heating coil 227 which has an axially placed intake end 228 at the right hand end of the cylinder, the coil pipe being led inward radially through the tubular member 333 joining pipe 225, the coil pipe being directed toward the center of the tubular member through a suitably packed opening 229. The tubular member 333 may be supported in the cylinder head 201 at the center as shown, the cylinder head being open at this point for this purpose, the tubular member being opposite the end of pipe 216 which discharges into the said tubular member 333.

The end 228 of the heating coil is connected by a pipe 230 placed inside the sponging steam supply pipe 216 and passed through the fitting 217 by way of a rotary packing gland or stuffing box 231 aligned with the cylinder axis, it being understood that the pipe 230 rotates with the cylinder. This rotary pipe 230 enters a stationary fitting 232 by way of stuffing box 233 and the fitting 232 is connected to the steam supply by a flexible pipe 234, the sponging steam supply pipe 218 being also connected to the steam supply by a flexible pipe 235. The coil may be exhausted through the right hand end of the cylinder by way of an eccentric passage 236 to which the end 337 of the coil is connected, the passage 236 leading to an axially placed passage 237 in the center of the journal member 222, to which passage a stationary exhaust pipe 238 is connected by a packing gland 239.

The principle of operation is the same as that described in connection with the first form of the invention.

I have thus described specifically and in detail a machine embodying my invention in various forms and the manner of operating and applying the same, the description being specific and in detail in order that the nature and operation of the invention may be clearly understood, however, the specific terms herein are used descriptively rather than in a limiting sense, the scope of the invention being defined in the claims.

What I claim as new and desire to secure by Letters Patent is:

1. The combination in a sponging and shrinking machine of a steaming cylinder, means for rotating the same, a leader and means for feeding the cloth and leader to the cylinder, a cylinder comprising walls of rigid porous material, the pores being open at the outer and inner surfaces of the walls.

2. The combination in a sponging and shrinking machine of a steaming cylinder, means for rotating the same, a leader and means for feeding the cloth and leader to the cylinder, a cylinder comprising walls of porous mineral of low heat conductivity.

3. In a machine for treating cloth with steam, a steaming cylinder having walls of porous stone, the pores being open at the inner and outer surfaces, and means for supplying steam to the inner surfaces of the porous walls, causing the same to issue therefrom uniformly throughout the cylindrical surface.

4. In a machine for treating cloth with steam, a steaming cylinder comprising a skeleton of non-corrosive T bars and walls of stone supported on the T bars, the walls having open porous passages from the inside to the outside of the cylinder.

5. In a machine for treating cloth with steam, a steam cylinder having a frame of non-corrosive metal and walls of porous stone supported on the frame, the pores being open at both the inner and outer surfaces of the walls and means for supplying steam to the inner surfaces of the walls causing the same to issue through the pores of the walls.

6. In a cloth sponging machine, a hollow cylinder having walls of rigid porous material, the pores being open at both the inner and outer surfaces, means for supplying steam under pressure to the inside of the cylinder and means for maintaining a vacuum therein.

7. In a cloth steaming device, an element of porous stone, means for bringing the same into contact with the cloth and means for maintaining a supply of steam under pressure in contact with the porous stone on the side of the same opposite to the cloth.

8. A cloth steaming device comprising a member of porous stone, means for maintaining the stone in close relation to the cloth and the cloth in close relation to the stone and means for bringing a supply of steam under pressure in contact with the porous stone on the side of the porous stone element opposite the cloth.

9. In a device for treating cloth with steam, a container for steam adapted to be brought in close relation to the cloth, means for supplying steam under pressure to the container, the said container having a wall portion of rigid porous material of low heat conductivity providing for a steam exuding surface on which the cloth is treated.

Signed by me at Baltimore, Maryland, this 5th day of August, 1927.

MARTIN E. POPKIN.